R. LIEBAU.
AIR SPRING SUSPENSION.
APPLICATION FILED FEB. 26, 1919.
1,368,564.
Patented Feb. 15, 1921.
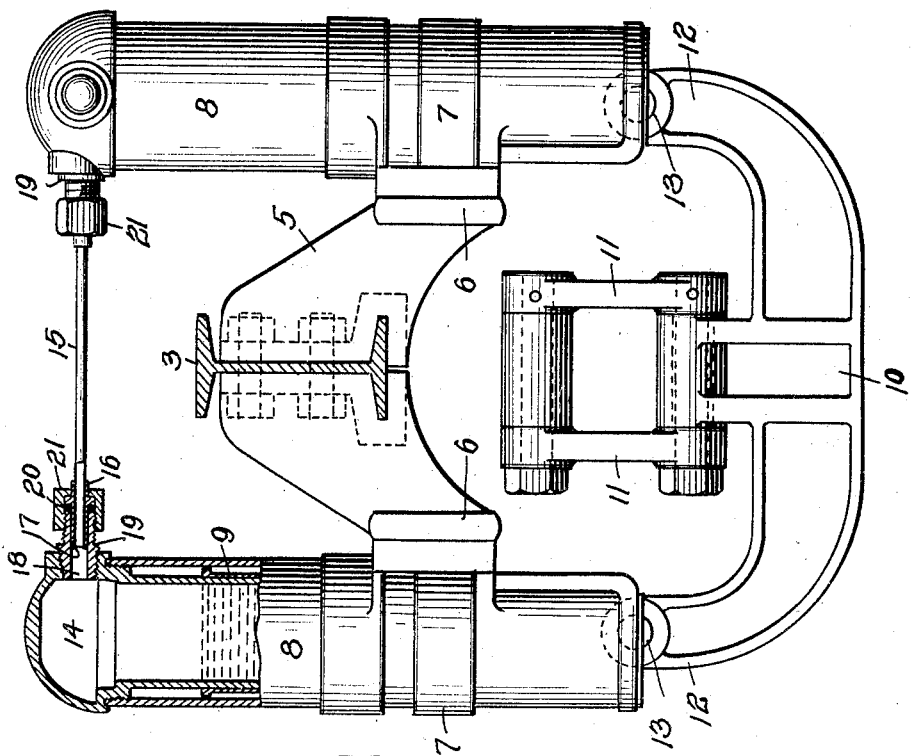
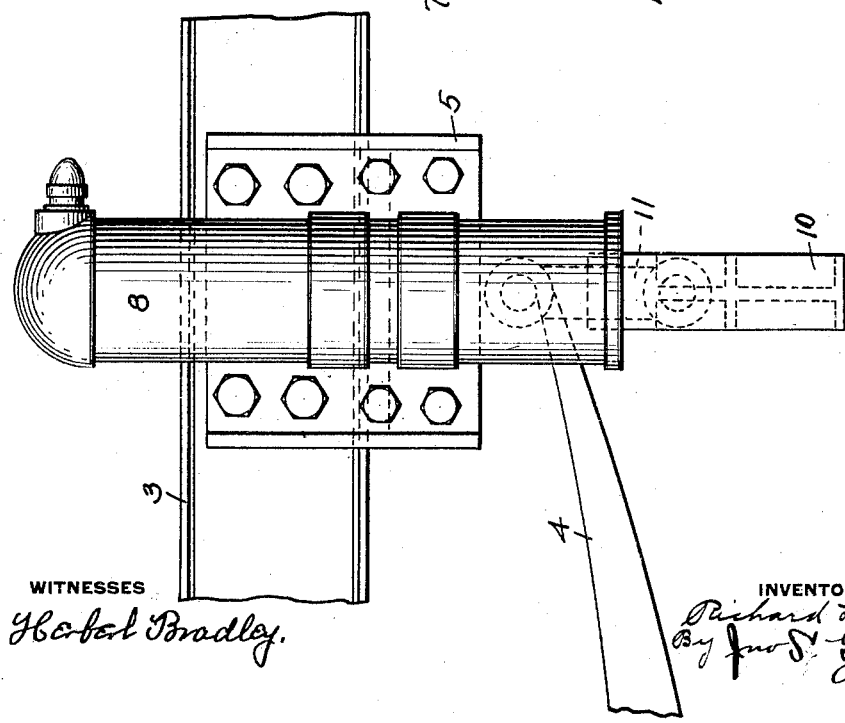
WITNESSES
J. Herbert Bradley.
INVENTOR
Richard Liebau
By Jno S. Green
Atty.

UNITED STATES PATENT OFFICE.

RICHARD LIEBAU, OF NEW HAVEN, CONNECTICUT, ASSIGNOR TO THE WESTING-HOUSE AIR SPRING COMPANY, A CORPORATION OF PENNSYLVANIA.

AIR-SPRING SUSPENSION.

1,368,564.  Specification of Letters Patent.  Patented Feb. 15, 1921.

Application filed February 26, 1919. Serial No. 279,433.

*To all whom it may concern:*

Be it known that I, RICHARD LIEBAU, a citizen of the United States, and a resident of New Haven, in the county of New Haven and State of Connecticut, have made a new and useful Invention in Air-Spring Suspension, of which the following is a specification.

This invention relates to vehicle air springs.

In order to equip vehicles it has heretofore been customary to manufacture a number of different sizes or capacities of air springs to accommodate vehicles for carrying widely varying loads, in other words, a three ton truck would require a much larger air spring than a pleasure vehicle and a six ton truck would require a much larger air spring than a three ton truck.

An object of this invention is to provide means whereby multiples of a standard size of spring may be utilized on a wide range of vehicles.

This, as well as other objects which will readily appear to those skilled in this art from an inspection of this application in the drawings of which Figs. 1 and 2 are end and side views, respectively, in elevation of a device embodying this invention.

3 represents one side of the frame of the load platform of a truck or similar vehicle and 4 represents one of the rear steel leaf springs which in the vehicle chosen for illustration lies underneath the frame member 3. To the frame member which is shown as an I beam section a two part bracket 5 is bolted. Each part of bracket 5 is provided with a pad 6 to which the outer or stationary portion 7 of an air spring 8 is secured.

Each of the air springs 8 consists of a stationary member 7 within which a cylindrical member 9 telescopes. The cylindrical member 9 as is now common in air springs of the Westinghouse type is provided with a cylinder bottom.

A yoke 10 by means of a shackle 11 is connected up to the rear end of steel spring 4 while the ends of arms 12 of the yoke are connected to the cylinder bottom by means of pin 13.

In order to cause the air springs 8 to exert equal pressures on the yoke their cushion chambers 14 are connected together so as to operate as one by means of pipe 15. Pipe 15 is preferably formed of ductile metal such as copper and each end is provided with a surrounding reinforcing member 16 which snugly fits the outside of the pipe and over the inner end of which the pipe is expanded or spun as shown at 17. Reinforcing member 16 is inserted without the central bore 18 of a screw plug 19 which communicates with the cushion chamber 14 and the joint between the rear enforcing member and the plug is sealed by means of an annular packing 20 held under compression by a nut 21.

The two springs 8 not only will have twice the carrying capacity of a single spring of the same size but on account of the connecting pipe will operate in unison on the load and serve all the purposes of a single spring of the same velocity as the combined spring.

Having thus described my invention what I claim is—

1. In combination with the steel spring and load platform of a vehicle, a pair of air springs supported by the load platform, and means connecting one element of each of said springs with the steel spring so that said air springs operate in parallel as a unit and in series with said steel spring to support the load.

2. In combination with a load platform and adjacent steel spring of a vehicle, two air springs, one element of each of which is connected to the load platform while another element of each is connected to the steel spring, means placing the cushion chambers of said air springs in communication one with the other so as to equalize the cushion pressures in said spring, and means for mounting vehicle air springs substantially as shown and described.

3. In combination with the side member of a vehicle frame and a leaf spring centrally located below said side member and air springs located on opposite sides of said frame member and means connecting said air springs together and to said steel spring.

4. In combination with the steel spring and the load platform of a vehicle, two pneumatic springs, each comprising telescoping elements, inclosing a chamber of variable volumetric capacity, means for mounting one element of each spring on the load platform, a yoke for securing the other elements of the springs together and to a steel spring of the vehicle, and means for establishing communication between the chambers of the two springs.

5. In combination with the steel spring and the load platform of a vehicle, two intercommunicating pneumatic springs secured to the load platform, and means for connecting movable members of the springs together and to the steel spring of the vehicle, so that said air springs operate in parallel as a unit and in series with the steel spring.

6. In combination with the steel spring and the load platform of a vehicle, two intercommunicating and interconnected pneumatic springs secured to the load platform and to the steel spring so that the springs operate in parallel as a unit, and in series with the steel spring to support the load platform.

In testimony whereof I have hereunto subscribed my name this 2nd day of December, 1918.

RICHARD LIEBAU.